US012777089B2

(12) United States Patent
Xiang et al.

(10) Patent No.: US 12,777,089 B2
(45) Date of Patent: Oct. 27, 2026

(54) METHOD AND APPARATUS FOR CLOUD-BASED HONEYPOT SERVICE DEPLOYMENT

(71) Applicant: Tencent Technology (Shenzhen) Company Limited, Shenzhen (CN)

(72) Inventors: Qi Xiang, Shenzhen (CN); Zhixin Lin, Shenzhen (CN); Liangkun Li, Shenzhen (CN); Ying Wang, Shenzhen (CN); Wenhui Dong, Shenzhen (CN); Quan Zhou, Shenzhen (CN); Wenjun Zhao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 99 days.

(21) Appl. No.: 18/887,744

(22) Filed: Sep. 17, 2024

(65) Prior Publication Data

US 2025/0016220 A1 Jan. 9, 2025

Related U.S. Application Data

(63) Continuation of application No. PCT/CN2023/130667, filed on Nov. 9, 2023.

(30) Foreign Application Priority Data

Dec. 30, 2022 (CN) ......................... 202211724025.7

(51) Int. Cl.
*G06F 15/173* (2006.01)
*H04L 43/12* (2022.01)
*H04L 67/10* (2022.01)

(52) U.S. Cl.
CPC .............. *H04L 67/10* (2013.01); *H04L 43/12* (2013.01)

(58) Field of Classification Search
CPC ................................ H04L 67/10; H04L 43/12
(Continued)

(56) References Cited

U.S. PATENT DOCUMENTS 8,391,299 B2 * 3/2013 Schliserman ....... H04L 12/2803 370/401
8,473,620 B2 * 6/2013 Demmer ................ H04L 69/40 709/227

(Continued)

FOREIGN PATENT DOCUMENTS

CN 112039717 A 12/2020
CN 113014597 A 6/2021
CN 114422254 A 4/2022

OTHER PUBLICATIONS

International Search Report with English translation and Written Opinion, Feb. 6, 2024, pp. 1-8, issued in PCT/CN2023/130667, China National Intellectual Property Administration, Beijing, China.

*Primary Examiner* — Alicia Baturay
(74) *Attorney, Agent, or Firm* — Crowell & Moring LLP

(57) ABSTRACT

This application relates to a method and apparatus for processing a security service, and to a device, a storage medium, and a program product related to the technical field of network security. The method includes: receiving a Honeypot service deployment request transmitted by a first device of a network content provider, the Honeypot service deployment request being configured to indicate a probe service type and a Honeypot service type; establishing, based on the Honeypot service type, a Honeypot service in a cloud corresponding to target network content, the target network content being network content provided by the network content provider; and establishing, based on the probe service type, a probe service of the network content provider. In this disclosure, a Honeypot service of the network content provider may be automatically created in
(Continued)

the cloud, thereby improves deployment efficiency of a Honeypot system.

20 Claims, 6 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 8,856,869 | B1 * | 10/2014 | Brinskelle | H04L 63/0823<br>726/2 |
| 10,110,629 | B1 * | 10/2018 | Kruse | H04L 63/1491 |
| 10,289,857 | B1 * | 5/2019 | Brinskelle | G06F 21/6218 |
| 10,484,331 | B1 * | 11/2019 | Rossman | H04L 63/0209 |
| 10,503,536 | B2 * | 12/2019 | Gunda | G06F 21/577 |
| 10,574,559 | B2 * | 2/2020 | Purushothaman | G06F 11/3409 |
| 10,581,960 | B2 * | 3/2020 | Gunda | G06F 9/5077 |
| 10,802,857 | B2 * | 10/2020 | Gunda | H04L 63/0471 |
| 10,802,858 | B2 * | 10/2020 | Gunda | G06F 21/50 |
| 10,805,332 | B2 * | 10/2020 | Gunda | H04L 63/1433 |
| 11,089,119 | B1 * | 8/2021 | Islam | H04L 67/53 |
| 11,128,667 | B2 * | 9/2021 | Shivamoggi | G06F 16/287 |
| 11,196,635 | B1 * | 12/2021 | Gelernter | H04L 41/0618 |
| 11,265,346 | B2 * | 3/2022 | Xiao | H04L 63/0281 |
| 11,271,907 | B2 * | 3/2022 | Xiao | H04L 43/028 |
| 11,327,784 | B2 * | 5/2022 | Gunda | H04L 63/0254 |
| 11,418,608 | B2 * | 8/2022 | Islam | H04L 63/0272 |
| 11,475,353 | B2 * | 10/2022 | Rangasamy | G06N 7/01 |
| 11,509,690 | B2 * | 11/2022 | St. Pierre | H04L 63/1458 |
| 11,516,050 | B2 * | 11/2022 | Dawani | H04L 12/4633 |
| 11,696,367 | B2 * | 7/2023 | Verzun | H04L 12/28<br>713/154 |
| 11,741,132 | B2 * | 8/2023 | Shivamoggi | G06F 16/285 |
| 11,757,844 | B2 * | 9/2023 | Xiao | H04L 63/0281<br>726/11 |
| 11,757,936 | B2 * | 9/2023 | Xiao | H04L 63/0227<br>726/22 |
| 11,863,639 | B2 * | 1/2024 | Islam | H04L 63/0428 |
| 12,487,770 | B2 * | 12/2025 | Rangasamy | G06F 3/0655 |
| 2021/0120022 | A1 * | 4/2021 | Kaderábek | H04L 63/101 |
| 2022/0182412 | A1 * | 6/2022 | Borak | H04L 63/20 |
| 2025/0039237 | A1 * | 1/2025 | Li | H04L 63/1491 |
| 2025/0211617 | A1 * | 6/2025 | Martin | H04L 63/302 |

* cited by examiner

METHOD AND APPARATUS FOR CLOUD-BASED HONEYPOT SERVICE DEPLOYMENT

RELATED APPLICATION

This application claims priority as a Continuation of PCT/CN2023/130667 filed on Nov. 9, 2023, which claims priority to Chinese Patent Application No. 202211724025.7, entitled "METHOD AND APPARATUS FOR PROCESSING SECURITY SERVICE, DEVICE, STORAGE MEDIUM, AND PROGRAM PRODUCT" and filed with the China National Intellectual Property Administration on Dec. 30, 2022, both of which are incorporated herein by reference.

FIELD OF THE TECHNOLOGY

This application relates to the technical field of network security, and in particular, to security service processing.

BACKGROUND OF THE DISCLOSURE

With continuous development of network technologies, more and more network content providers provide a diversity of network content for users by means of the Internet. Correspondingly, people pay more and more attention to a network security issue.

In the related art, a Honeypot system may be deployed to capture or analyze a network attack behavior. Specifically, the Honeypot system in a related system is manually deployed in the form of an offline installation package in a machine room of the network content provider by service personnel of the Honeypot system.

However, in the above related art, a solution in which the service personnel of the Honeypot system deploy the Honeypot system offline requires high operational complexity, thereby having a great impact on deployment efficiency of the Honeypot system.

SUMMARY

Exemplary embodiments of this disclosure provide a method and apparatus for processing a security service, a device, a storage medium, and a program product, which can improve deployment efficiency of a Honeypot system. The technical solution is as follows.

According to a first aspect, a method for processing a security service is provided, the method being performed by a cloud server, and the method including:

- receiving a Honeypot service deployment request transmitted by a network content provider, the Honeypot service deployment request being configured to indicate a probe service type and a Honeypot service type, and the probe service type being configured to indicate a traffic leading mode;
- establishing, based on the Honeypot service type, in a cloud a Honeypot service corresponding to target network content, the target network content being network content provided by the network content provider; and
- establishing a probe service of the probe service type, the probe service being configured to lead access traffic to the target network content to the Honeypot service.

According to another aspect, an apparatus processing a security service is provided, the apparatus including:

- a request receiving module, configured to receive a Honeypot service deployment request transmitted by a network content provider, the Honeypot service deployment request being configured to indicate a probe service type and a Honeypot service type, and the probe service type being configured to indicate a traffic leading mode;
- a Honeypot service establishing module, configured to establish, based on the Honeypot service type, in a cloud a Honeypot service corresponding to target network content, the target network content being network content provided by the network content provider; and
- a probe service establishing module, configured to establish a probe service of the probe service type, the probe service being configured to lead access traffic to the target network content to the Honeypot service.

In an exemplary implementation, the probe service type includes an intrusive traffic leading type or a non-intrusive traffic leading type.

In an exemplary implementation, in response to that the probe service type includes an intrusive traffic leading type, the probe service establishing module is configured to:

- create a rule engine and a leading engine of the probe service in the cloud,
- the rule engine being configured to identify whether the access traffic to the target network content is access traffic of a specified type, and
- the leading engine being configured to lead, based on an identification result of the rule engine, the access traffic of a specified type to the Honeypot service.

In an exemplary implementation, the apparatus further includes:

- a rule receiving module, configured to receive a traffic identification rule transmitted by a first device, the traffic identification rule being configured to indicate a determining condition for the access traffic of a specified type; and
- a rule delivery module, configured to deliver the traffic identification rule to the rule engine.

In an exemplary implementation, in response to that the probe service type includes a non-intrusive traffic leading type, the probe service establishing module is configured to:

- create an elastic network interface (ENI) between a provider network and the Honeypot service, the provider network being a network providing the target network content; and
- configure, based on the ENI, a network address translation (NAT) rule between the provider network and the Honeypot service, the NAT rule being configured to instruct the ENI to forward the access traffic to the target network content to the Honeypot service.

In an exemplary implementation, the probe service establishing module is configured to:

- create a virtual private cloud (VPC) in the provider network;
- insert the ENI in the VPC, the ENI being bound to the Honeypot service;
- apply for, in the VPC, a virtual address of the ENI; and
- bind the virtual address of the ENI to a public network address or an Intranet address of the provider network.

In an exemplary implementation, the probe service establishing module is configured to:

- create a proxy host in the VPC of the provider network, the VPC corresponding to the Honeypot service;
- create, based on the proxy host, a destination network address translation (DNAT) rule, the DNAT rule being configured to forward traffic of the proxy host to the Honeypot service;
- apply for the ENI in the VPC; and
- bind the ENI to the proxy host.

In an exemplary implementation, the probe service establishing module is further configured to bind a security group rule for the ENI, the security group rule being configured to prohibit the access traffic leaded into the Honeypot service from actively accessing the provider network.

In an exemplary implementation, the apparatus further includes:

- an obtaining module, configured to obtain an establishment result and a number of establishment times of the Honeypot service or the probe service; and
- a reestablishing module, configured to reestablish, in response to that the establishment result is that establishment fails and the number of establishment times does not reach a number of times threshold, the Honeypot service or the probe service failing to be established.

In an exemplary implementation, the apparatus further includes:

- an information returning module, configured to return, in response to that the establishment result is that establishment fails and the number of establishment times reaches the number of times threshold, information indicating that the Honeypot service or the probe service fails to be established to a console of a cloud server.

In an exemplary implementation, the apparatus further includes:

- a recording module, configured to record a behavior record of the access traffic in the Honeypot service; and
- a transmitting module, configured to return the behavior record to the network content provider.

According to still another aspect, a computer device is provided, the computer device including a processor and a memory, the memory having at least one computer program stored therein, and the at least one computer program being loaded and performed by the processor to implement the above method for processing a security service.

According to yet another aspect, a computer-readable storage medium is provided, the computer-readable storage medium having at least one computer program stored therein, and the computer program being loaded and performed by a processor to implement the above method for processing a security service.

According to still yet another aspect, a computer program product including computer programs is provided, the computer program product, when running on a computer, causing the computer to perform the method for processing a security service according to the above aspect.

The technical solutions provided in this disclosure may include the following beneficial effects.

The cloud server receives the Honeypot service deployment request transmitted by the first device of the network content provider, and establishes, based on the probe service type and the Honeypot service type indicated by the request, the Honeypot service and the probe service corresponding to the target network content, to lead the access traffic to the target network content to the Honeypot service by means of the probe service. In the above solution, only the network content provider needs to configure the probe service type and the Honeypot service type online, namely, the Honeypot service of the network content provider may be automatically created in the cloud, and there is no need for service personnel of the Honeypot system to deploy the Honeypot system offline, thereby improving deployment efficiency of the Honeypot system.

DESCRIPTION OF EMBODIMENTS

Figure 1:
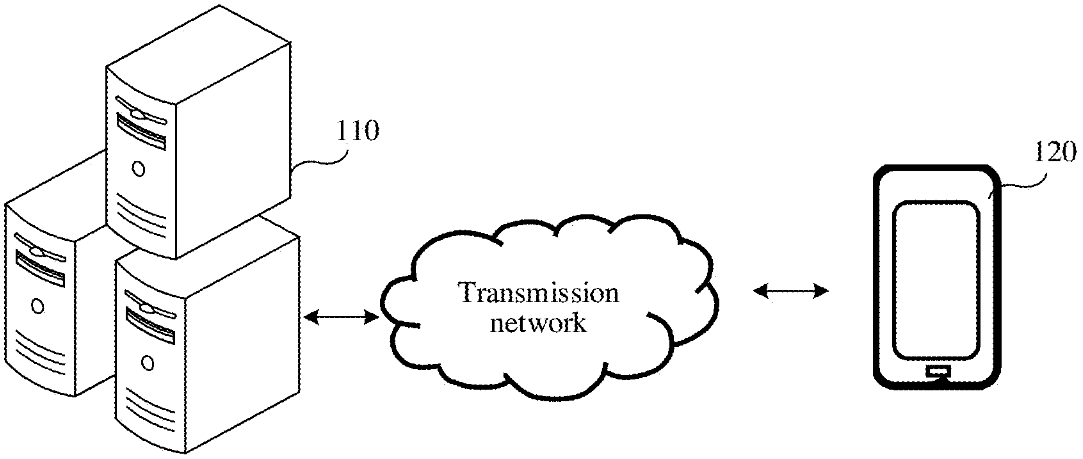
FIG. 1 is a schematic diagram of a system according to an exemplary embodiment of this disclosure.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with this disclosure. On the contrary, the implementations are merely examples of apparatuses and methods that are described in detail in the appended claims and that are consistent with some aspects of this disclosure.

"Plurality of" mentioned in the specification means two or more. "And/or" describes an association relationship of associated objects and represents that three relationships may exist, for example, A and/or B may represent the following three cases: only A exists, both A and B exist, and only B exists. The character "I" herein generally indicates an "or" relationship between the associated objects.

An exemplary embodiment of this disclosure provides a method for deploying a Honeypot service in a cloud, which may automatically establish a Honeypot system for a network content provider, so that deployment efficiency of the Honeypot system can be improved. To facilitate understanding, the following explains several terms involved in this disclosure.

(1) Cloud Security

Cloud security refers to a collective name of security software, hardware, a user, an institution, and a secure cloud platform based on a cloud computing business mode application. The cloud security fuses emerging technologies and concepts such as parallel processing, grid computing, and behavioral judgment of unknown viruses. Through abnormal monitoring of software behaviors in a network by a large number of clients in a mesh, latest information of Trojan horses and malicious programs in the Internet is acquired, and transmitted to a server for automatic analysis and processing, and then solutions of the viruses and the Trojan horses are distributed to each client.

The cloud security research direction includes the following: 1. Cloud computing security, which mainly studies how to ensure security of cloud itself and various applications on the cloud, including cloud computer system security, secure storage and isolation of user data, user access authentication, information transmission security, network attack prevention, compliance audit, and the like. 2. Cloudification of a security infrastructure, which mainly studies how to use cloud computing to newly create and integrate security infrastructure resources, optimize a security protection mechanism, including constructing a super-large-scale security event and information collecting and processing platform through a cloud computing technology, to implement collection and associated analysis of massive information, and improve a network-wide security event control capability and a risk control capability. 3. Cloud security service: which mainly studies various security services provided for users based on a cloud computing platform, such as an anti-virus service.

(2) Honeypot

It is a technology for deceiving an attacker. Some hosts, network services, or information used as bait are arranged to entice the attacker to attack them, so that an attack behavior can be captured and analyzed, a tool and a method used by the attacker are learned, an attack intention and an incentive are inferred, and defenders can clearly understand security threats they face.

(3) Elastic Network Interface (ENI)

It is an elastic network interface bound to a cloud server in a virtual private cloud (VPC), which can freely migrate among a plurality of cloud servers.

(4) Elastic IP (EIP)

A user can bind or unbind an EIP instance to an instance such as a cloud server, a load balance, a network address translation (NAT) gateway, a virtual private network (VPN) gateway, or the like.

(5) Load Balance (LB)/Classic LB (CLB)

The load balance is built on a network structure, and provides an inexpensive, effective, and transparent method to expand bandwidths of network devices and servers, increase throughput, enhance a network data processing capability, and improve network flexibility and usability. Various enterprises usually place a portal website on the LB.

(6) Virtual Private Cloud (VPC)

It is a dedicated on-cloud network space, which is constructed based on a cloud platform, and provides network services for resources of users in a cloud, so that logical isolation may be implemented between different private networks.

(7) Real Server (RS)

It is a server configured to really process requests of users.

(8) High-Availability Virtual IP (HAVIP)

It is an Intranet IP address allocated from VPC subnetwork Classless Inter-Domain Routing (CIDR), which is usually used in combination with high-availability software to be applied to a scenario for constructing a high-availability master/standby cluster.

(9) Probe

It is a form in which a Honeypot service is exposed to the outside and is more commonly in the form of: an EIP, an Intranet IP, a domain name, and the like.

FIG. 1 shows a schematic diagram of a system used by a method for processing a security service provided by an exemplary embodiment of this disclosure. As shown in FIG. 1, the system includes: a server 110 and a terminal 120.

The server 110 may be a stand-alone physical server, a server cluster composed of a plurality of physical servers or a distributed system, and may also be a cloud server providing cloud services, cloud databases, cloud computing, cloud functions, cloud storage, network services, cloud communication, middleware services, domain name services, security services, a content delivery network (CDN), big data and artificial intelligence platforms, and other basic cloud computing services.

The server 110 may include a server deployed with a Honeypot management system and providing deployment, management, and running of a Honeypot system to a user of a network content provider through the Honeypot management system. Alternatively, the server 110 may also include a server deployed by the network content provider and configured to provide network content to the user.

The terminal 120 may be a terminal device having a network connection function and a data processing function. For example, the terminal 120 may be a smartphone, a tablet computer, an e-book reader, smart glasses, a smart watch, a smart television, a laptop computer, a desktop computer, and the like.

The terminal 120 may include a user terminal of the network content provider, or the terminal 120 may also include a user terminal configured to access network content provided by the network content provider.

In some exemplary embodiments, the above system includes one or more servers 110 and a plurality of terminals 120. The number of the server 110 and the terminal 120 is not limited in the exemplary embodiment of this disclosure.

The terminal is connected to the server through a communications network. In some exemplary embodiments, the communications network is a wired network or a wireless network.

In some exemplary embodiments, the above wireless network or wired network uses a standard communication technology and/or protocol. The network is usually the Internet, but may be any other network, including but not limited to a local area network (LAN), a metropolitan area network (MAN), a wide area network (WAN), a mobile, wired, or wireless network, or any combination of a private network or a virtual private network. In some exemplary embodiments, data exchanged by means of a network may be represented by using a technology and/or format such as the hyper text mark-up language (HTML) and the extensible markup language (XML). In addition, all or some of links may be encrypted by using a conventional encryption technology such as the secure socket layer (SSL), the transport layer security (TLS), the virtual private network (VPN), and the Internet protocol security (IPsec). In some other exemplary embodiments, custom and/or private data communication technologies may also be used to replace or supplement the above data communication technology. This is not limited in this disclosure.

Currently, most Honeypot systems on the market need to select, based on a business model of a company, Honeypot types matching therewith, which is isolated from a normal service. However, conventional Honeypots are deployed in machine rooms of users, and are manually deployed in various areas, such as an office area and a production area, in the form of offline installation packages. Then, various types of forwarding policies are manually configured, so that Honeypot traffic migration meets expectation.

A Honeypot system also has a relatively important problem that after an attacker attacks a Honeypot and further escapes, the Honeypot can be used as a springboard to expand an intrusion range, thereby attacking more machines of a tenant, which causes an irreparable loss to the tenant. A conventional Honeypot system may adopt a complex solution (nested virtualization or the like) at this point to ensure that it is difficult for the attacker to escape. Even in a deployment network of the tenant, various network policies are adopted according to the actual conditions to limit actions of the Honeypot escaping and moving laterally.

Specifically, deployment of the conventional Honeypot system is isolated from the normal service, requires an extremely high degree of simulation of the Honeypot, and also needs to be disseminated to a network in various manners to induce the attacker to step on the Honeypot. The deployment mode is too long in path, failing to lead traffic for the normal service as required, and consequently there is no way to improve a utilization rate of the Honeypot, and a protection capability on the service is limited.

For the conventional Honeypot system, it requires great effort to install the Honeypot during deployment. The traffic leading mode of deployment is high in cost, and usually requires technician support provided by a Honeypot manufacturer to allow the Honeypot to normally run. Even operation and maintenance personnel of the tenant need to resolve complex network problems together to deploy the Honeypot to an appropriate location.

The conventional Honeypot system may use many complex virtualization technologies on a problem of network isolation of the Honeypot, and consequently difficulty and stability of a product solution cannot be ensured. Alternatively, the conventional Honeypot system needs to configure various types of network policy restrictions. If network topology of the tenant is not understood, configuration complexity is high, and services of the tenant may be affected due to wrong configuration.

Figure 2:
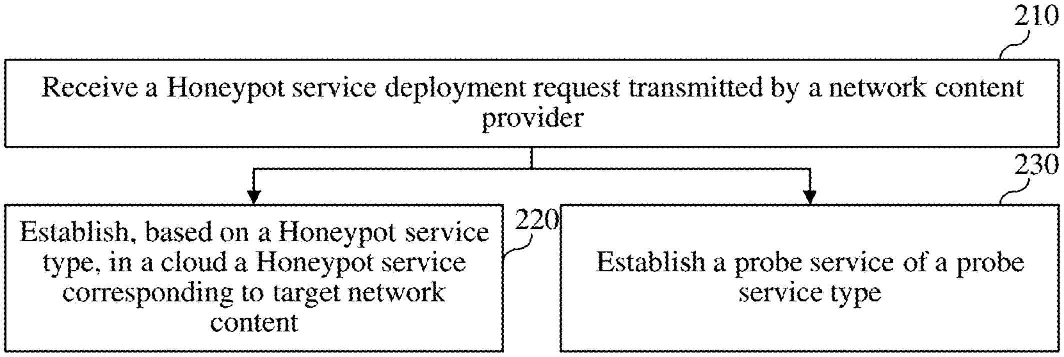
FIG. 2 is a flowchart of a method for processing a security service according to an exemplary embodiment of this disclosure.

FIG. 2 shows a flowchart of a method for processing a security service according to an exemplary embodiment of this disclosure. The method is performed by a computer device. The computer device can be implemented as a cloud server. The cloud server may be the server 110 shown in FIG. 1. As shown in FIG. 2, the method for processing a security service includes the following operations.

Operation 210: Receive a Honeypot service deployment request transmitted by a network content provider.

The Honeypot service deployment request is configured to indicate a probe service type and a Honeypot service type, and the probe service type is configured to indicate a traffic leading mode. The Honeypot service deployment request may be generated by the network content provider and transmitted to a cloud server through a device. The device may be, for example, a first device. The traffic leading mode indicated by the probe service type may identify which kind of traffic leading mode is to be used to lead access traffic for accessing target network content into a Honeypot service.

In an exemplary implementation, the above probe service type includes an intrusive traffic leading type or a non-intrusive traffic leading type.

The intrusive traffic leading type is a traffic leading type that intervenes into a business process of the network content provider through a probe service. For example, the probe service of the intrusive traffic leading type may lead malicious access traffic for accessing network content provided by the network content provider to the Honeypot service, and release non-malicious access traffic.

The above non-intrusive traffic leading type is a traffic leading type in which the probe service does not intervene in the business process of the network content provider. For example, the probe service of the non-intrusive traffic leading type forwards the access traffic for accessing the network content provided by the network content provider to the Honeypot service in full.

The above Honeypot service type indication may be a Honeypot type of a to-be-established Honeypot service, for example, a database-type Honeypot, a web page-type Honeypot, a mail-type Honeypot, a secure shell (SSH)-type Honeypot, or a file transfer protocol (FTP)-type Honeypot. The Honeypot service type may include at least one Honeypot type. Because the Honeypot service is a service configured to serve as a bait to deceive an attacker into thinking that the target network content has been accessed, a Honeypot type specifically included in the Honeypot service type may be related to the target network content.

In an exemplary embodiment of this disclosure, the cloud server may push a Honeypot configuration page to the network content provider in the form of a web page or an APP. An operator of the network content provider may configure, through the Honeypot configuration page, information such as the probe service type and the Honeypot service type of a Honeypot service required to be deployed.

In an exemplary implementation, the above probe service type and the above Honeypot service type may be explicitly or implicitly indicated by the Honeypot service deployment request.

For example, the above Honeypot service deployment request may directly carry indication information of the probe service type and indication information of the Honeypot service type in an explicit manner. For example, the Honeypot service deployment request may include a probe service type indication domain and a Honeypot service type indication domain. The probe service type indication domain and the Honeypot service type indication domain indicate the above probe service type and the above Honeypot service type through a bit value, respectively. For specific example, when a value of the probe service type indication domain is 0, it indicates that the probe service type is the intrusive traffic leading type, and when the value of the probe service type indication domain is 1, it indicates that the probe service type is the non-intrusive traffic leading type. For another example, when a value of the Honeypot service type indication domain is 0, it indicates that the Honeypot service type is an SSH type, and when the value of the Honeypot service type indication domain is 1, it indicates that the Honeypot service type is a database type.

For another example, the above Honeypot service deployment request may carry one of the indication information of the probe service type and the indication information of the Honeypot service type in an explicit manner, and indicate the other of the probe service type and the Honeypot service type in an implicit manner. For example, the Honeypot service deployment request may include the probe service type indication domain. In addition, a destination address of the Honeypot service deployment request indicates the Honeypot service type (in other words, the Honeypot service deployment request requesting to establish different types of Honeypot services is transmitted to different destination addresses, thereby implementing traffic diversion established by the different types of Honeypot services). For another example, the Honeypot service deployment request may include the Honeypot service type indication domain. In addition, the destination address of the Honeypot service deployment request indicates the probe service type (in other words, the Honeypot service deployment request requesting to establish different types of probe services is transmitted to different destination addresses, thereby implementing traffic diversion established by the different types of probe services).

For another example, the probe service type and the Honeypot service type may be indicated in the above Honeypot service deployment request in an implicit manner. For example, the destination address of the Honeypot service deployment request indicates a combination of the probe service type and the Honeypot service type. In other words, the Honeypot service deployment request requesting to establish different types of probe services and Honeypot services is transmitted to different destination addresses, thereby implementing traffic diversion established by the different types of probe services and Honeypot services.

In an exemplary implementation, other information than the probe service type and the Honeypot service type may also be indicated in the above Honeypot service deployment request, for example, other information required for deploying the Honeypot service in the cloud. For example, the above Honeypot service deployment request may further indicate a network address or a network content address that the network content provider needs to protect, authorization information required to deploy a Honeypot system, custom information (such as a custom traffic identification rule) of the network content provider, and the like.

In another exemplary implementation, the above other information may also be acquired through other requests than the Honeypot service deployment request or in other manners. For example, the cloud server may read the above other pre-stored information from a cloud database.

Operation 220: Establish, based on the Honeypot service type, in a cloud a Honeypot service corresponding to target network content.

The target network content is network content provided by the network content provider.

In an embodiment of this disclosure, the cloud server may maintain a Honeypot service cluster (which may be referred to as a Honeyfarm), including Honeypot services established for various network content providers (which may be referred to as tenants). After receiving the above Honeypot service deployment request, the cloud server may establish a Honeypot service of the network content provider in the Honeyfarm according to the Honeypot service type indicated by the Honeypot service deployment request.

Operation 230: Establish a probe service of the probe service type.

The probe service is configured to lead access traffic to the target network content to the Honeypot service.

In an exemplary embodiment of this disclosure, after receiving the above Honeypot service deployment request, the cloud server may establish the probe service corresponding to the target network content for the network content provider according to the probe service type indicated by the Honeypot service deployment request. The probe service may implement a function of leading access traffic to the target network content to the Honeypot service of the network content provider.

The above operation (operation 220) of establishing the Honeypot service and the above operation (operation 230) of establishing the probe service may be performed sequentially or synchronously. For example, the cloud server may first perform operation 220 of establishing the Honeypot service and then perform operation 230 of establishing the probe service. Alternatively, the cloud server may first perform operation 230 of establishing the probe service and then perform operation 220 of establishing the Honeypot service. Alternatively, the cloud server may perform operation 220 and operation 230 synchronously.

During or after establishing the above probe service and the above Honeypot service, the cloud server may bind the probe service and the Honeypot service, so that the probe service subsequently leads the access traffic to the network content provided by the network content provider to the Honeypot service. For example, the cloud server may configure identification information of the Honeypot service (an address or number of the Honeypot service) into the probe service.

Figure 3:
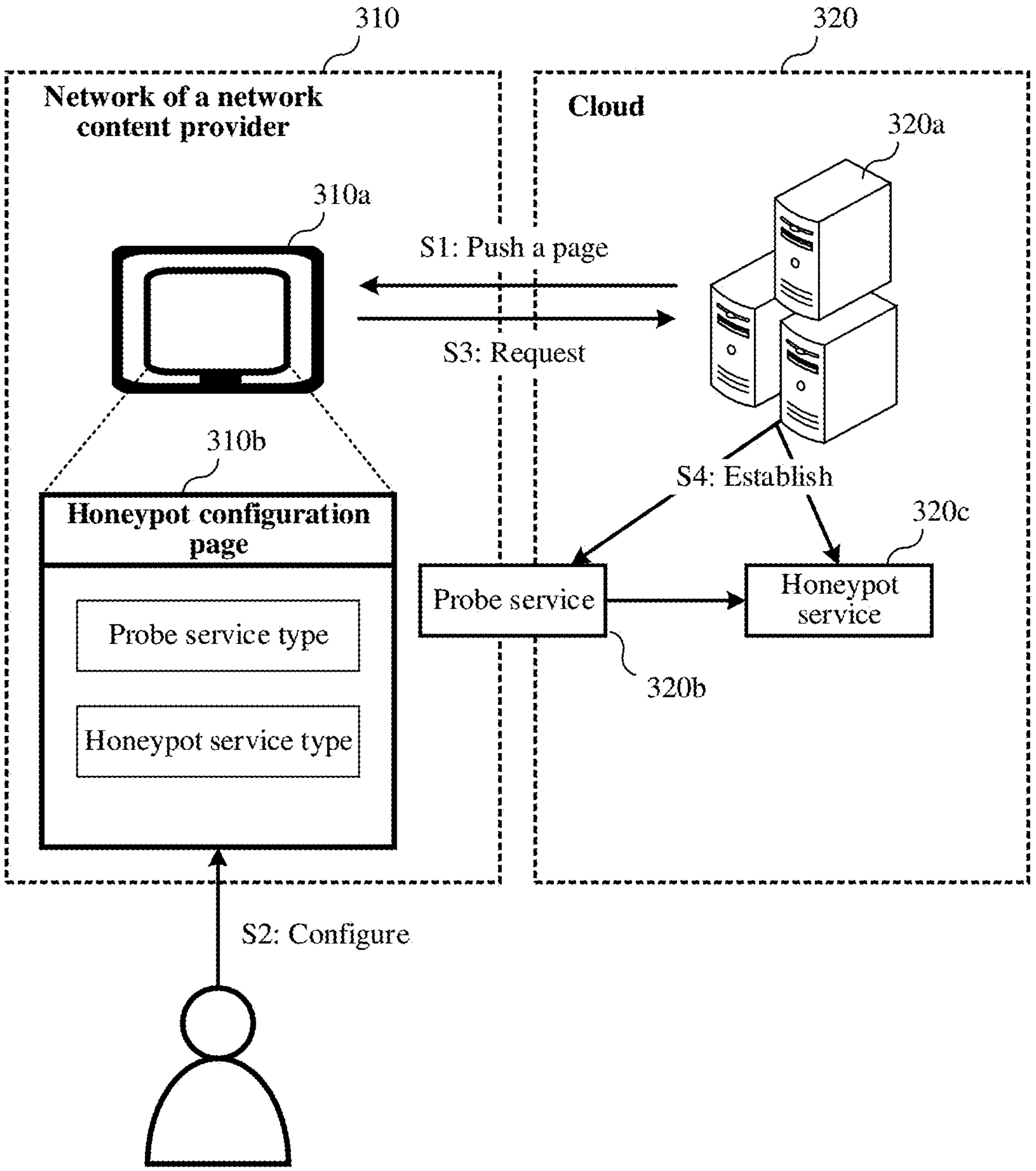
FIG. 3 is a frame diagram of establishment of a Honeypot system according to the exemplary embodiment in FIG. 2.

Please refer to FIG. 3 which shows a frame diagram of establishment of a Honeypot system according to an exemplary embodiment of this disclosure. As shown in FIG. 3:

S1: In a network 310 of a network content provider, a first device 310*a* accesses a cloud server 320*a* in a cloud 320, and the cloud server 320*a* pushes a Honeypot configuration page 310*b* to the first device 310*a*.

S2: A user of the first device 310*a* configures information such as a probe service type and a Honeypot service type through the Honeypot configuration page 310*b*.

S3: After the user completes configuration in the Honeypot configuration page 310*b*, the first device 310*a* transmits a Honeypot service deployment request to the cloud server 320*a*, where the request indicates the information such as the probe service type and the Honeypot service type configured by the user.

S4: The cloud server 320*a* establishes a probe service 320*b* and a Honeypot service 320*c*.

Subsequently, access traffic for accessing target network content provided by the network content provider is to be partially or entirely leaded to the Honeypot service 320*c* through the probe service 320*b*.

In an exemplary implementation, to improve stability of creation of the Honeypot system, establishment of the Honeypot service or the probe service is completed as much as possible in a limited number of times. The cloud server may also acquire an establishment result and a number of establishment times of the Honeypot service or the probe service, and reestablishes, in response to that the establishment result is that establishment fails and the number of establishment times does not reach a number of times threshold, the Honeypot service or the probe service failing to be established.

In an exemplary implementation, in order to achieve that a developer or a maintainer learns of a vulnerability or a problem of the Honeypot system in time, the cloud server returns, in response to that the establishment result is that the establishment fails and the number of establishment times reaches the number of times threshold, information indicating that the Honeypot service or the probe service fails to be established to a console of the cloud server.

In other words, when the Honeypot service or the probe service can still not be successfully established after a plurality of attempts, the information indicating that establishment fails is returned, so that a control party of the cloud server can timely learn of the situation that a problem has occurred and resolves the problem. In addition, reestablishing the Honeypot service or the probe service that has been successfully established all the time stops after a number of times of establishment failures reaches a number of times threshold, which can also effectively save system resources.

In an exemplary implementation, the cloud server may also record a behavior record of the access traffic in the Honeypot service. The behavior record is returned to the network content provider.

In the implementation, the behavior record of the access traffic in the Honeypot service is returned to the network content provider, so that the network content provider can clearly learn of abnormal access traffic to the target network content and a corresponding abnormal behavior. The network content provider may receive the behavior record through a device, such as a second device.

In an exemplary embodiment of this disclosure, because the Honeypot service is established and runs in the cloud, and in a network that is not the network content provider, to make the network content provider timely understand a situation in which the target network content is attacked, the cloud server may also transmit the behavior record of the access traffic in the Honeypot service to the second device of the network content provider, so that the network content provider can timely understand and analyze a source, an attack mode, and the like of malicious access traffic that attacks the target network content, to make security protection for response.

The behavior record of the access traffic in the above Honeypot service may include behaviors, such as a jump behavior and a private message reading behavior, related to network security.

Based on the above, according to the solution shown in the exemplary embodiment of this disclosure, the cloud server receives the Honeypot service deployment request transmitted by the first device of the network content provider, and establishes, based on the probe service type and the Honeypot service type indicated by the request, the Honeypot service and the probe service corresponding to the target network content, to lead the access traffic to the target network content to the Honeypot service through the probe service. In the above solution, only the network content provider needs to configure the probe service type and the Honeypot service type online, namely, the Honeypot service of the network content provider may be automatically created in the cloud, and there is no need for service personnel of the Honeypot system to deploy the Honeypot system offline, thereby improving deployment efficiency of the Honeypot system.

Figure 4:
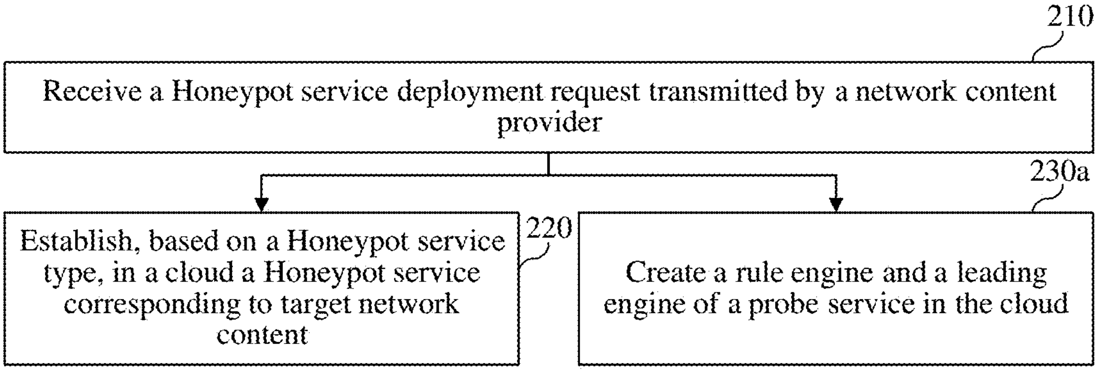
FIG. 4 is a flowchart of a method for processing a security service according to an exemplary embodiment of this disclosure.

Based on the solution shown in FIG. 2, FIG. 4 shows a flowchart of a method for processing a security service according to an exemplary embodiment of this disclosure. In other words, in a case that the probe service type includes the intrusive traffic leading type, operation 230 may be replaced with operation 230*a*.

Operation 230*a*: Create a rule engine and a leading engine of the probe service in the cloud.

The rule engine is configured to identify whether the access traffic to the target network content is access traffic of a specified type, and the leading engine is configured to lead, based on an identification result of the rule engine, the access traffic of a specified type to the Honeypot service.

In an exemplary embodiment of this disclosure, in response to that the probe service type includes the intrusive traffic leading type, the cloud server may establish the probe service including the rule engine and the leading engine in the cloud (for example, a cloud firewall).

For example, by using that the probe service including the rule engine and the leading engine is established in the cloud firewall as an example, in an exemplary implementation, a probe service establishment component may be preset in the cloud firewall. For example, the probe service component may be a virtual machine. In response to that the probe service type includes the intrusive traffic leading type, the cloud server transmits a probe service establishment indication to the probe service establishment component. The probe service establishment component receives the probe service establishment indication, establishes, according to the probe service establishment indication, one probe service including the rule engine and the leading engine, and returns identification information of the probe service, such as an address or number of the probe service, to the cloud server. The cloud server binds identification information of the probe service to identification information of the network content provider (for example, an account of the network content provider or an access address of network content provided by the network content provider).

After the probe service including the rule engine and the leading engine is established in the cloud, the access traffic for accessing the target network content may be forwarded to the rule engine. The rule engine determines whether the access traffic is malicious access traffic. If it is determined that the access traffic is the malicious access traffic, the access traffic is leaded to the Honeypot service. If it is determined that the access traffic is non-malicious access traffic, the access traffic is released to access an RS of the target network content.

Figure 5:
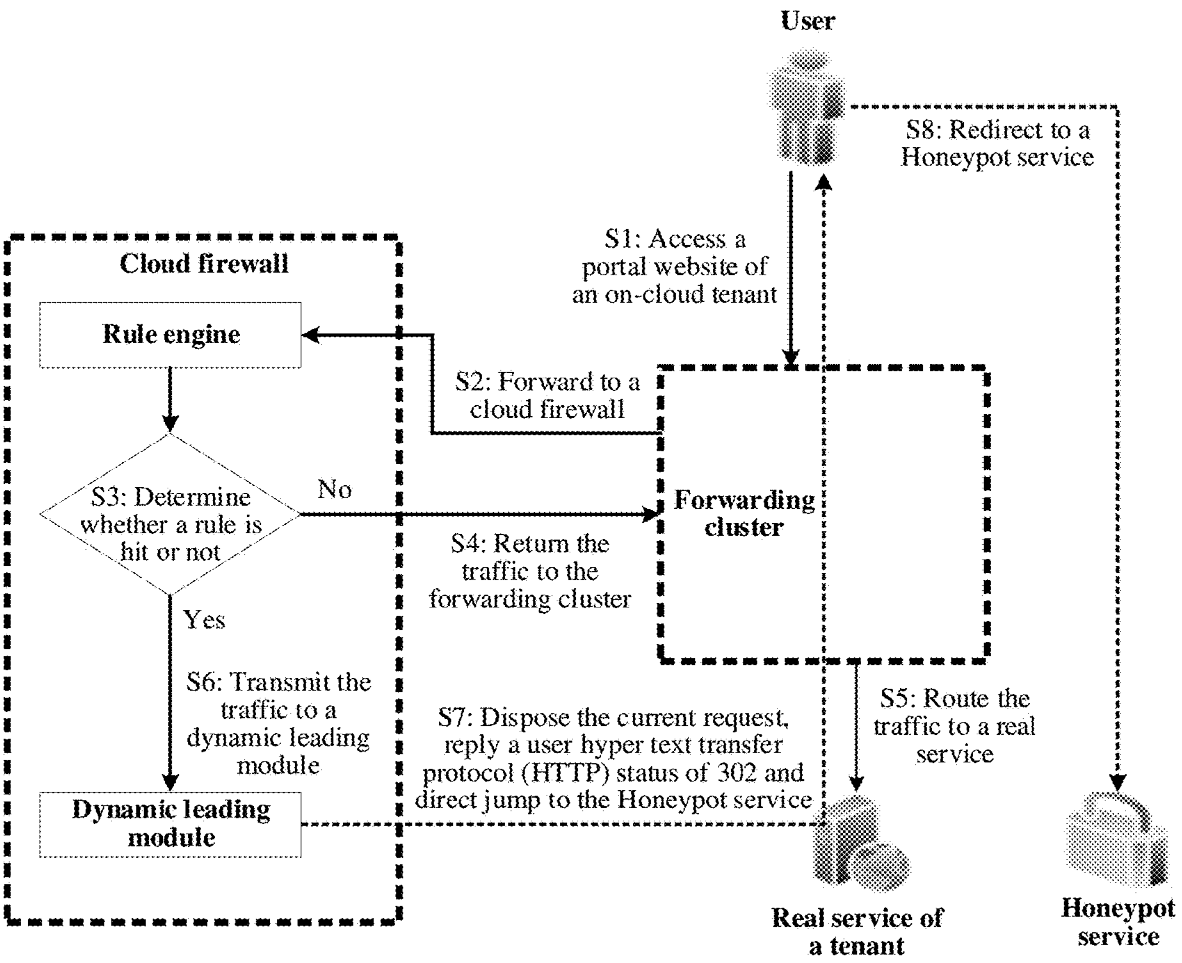
FIG. 5 is an architectural diagram of a Honeypot system of an intrusive traffic leading mode according to the exemplary embodiment in FIG. 4.

Please refer to FIG. 5 which shows an architectural diagram of a Honeypot system of an intrusive traffic leading mode according to an exemplary embodiment of this disclosure. Taking that the probe service is established in the cloud firewall as an example, as shown in FIG. 5, a creating and running process of the Honeypot system based on the intrusive traffic leading mode is as follows.

- S1: A certain user accesses a portal website (for example, www.test.com) deployed by an on-cloud tenant (namely, the network content provider).
- S2: Traffic is forwarded through a cloud forwarding cluster. Currently, it is defaulted that the user accesses the cloud firewall. Therefore, the traffic forwards an original L3 message to a cloud firewall engine in two manners: virtual extensible local area network (VXLAN) tunneling technology packet+generic routing encapsulation-generic network virtualization encapsulation (GRE-GENEVE) tunneling.
- S3: The firewall engine first filters, through an access control list (ACL) access control module, an access control rule configured by the user, releases whitelist traffic, and blocks blacklist traffic. The traffic released by the ACL access control module then passes through a decoding module. The decoding module may first parse a traffic protocol to reassemble a stream session, and performs common decoding (for example, base64, uniform resource locator decoding (urlDecode), or confused character string filtering) for reassembled traffic. Then, through the rule engine of the probe service, match an unpacking rule or a preconfigured rule for a decoded message. If the rule is hit, it may be determined that the message is a malicious attack. If the rule is not hit, it may be determined that the message is normal traffic.

S4: If the current traffic is a normal service request, the rule engine of the probe service releases the session without task processing, and the session travels back to a forwarding cluster according to original routing through Vxlan tunneling and Gre-Geneve tunneling.

S5: The forwarding cluster receives a data message passed back, and directly routes, according to the current routing forwarding policy, the traffic to a real service deployed by the tenant, so that the user can normally receive and return a hyper text transfer protocol (HTTP) Status 200 page, which functions normally.

S6: Determine that the current message is an attack message if the current message passes through the matched hit rule. In this case, the rule engine of the probe service transmits a message of the current traffic to a dynamic leading module (namely, the leading engine of the above probe service) for processing.

S7: The dynamic leading module may perform the following two operations according to a preconfigured background Honeypot address (namely, an address of a Honeypot service of the tenant).

(A) Dispose the current request and no longer forward a request to the real service of a customer, thereby protecting the current assets against attack.

(B) Meanwhile, directly reply a current user HTTP status of 302, and direct jump to a preconfigured Honeypot service, such as www.test.com/login.

S8: After receiving the HTTP Status of 302 and jumping, a terminal of the user directly redirects to the Honeypot service of www.test.com/login; the Honeypot service then receives a malicious attack, and then feeds back a result after performance to the user; and subsequent interaction is direct interaction performed by the user and the Honeypot service, which avoids interference in the real service.

The above solution describes a probe service deployment mode of intrusive traffic leading by using that the probe service is established in a cloud firewall service as an example. In some exemplary embodiments, the above probe service of intrusive traffic leading may also be deployed in other cloud services (for example, a cloud network application protection service or a cloud distributed denial of service (DDoS) attack protection system and other security services).

In an exemplary implementation, the cloud server may also receive a traffic identification rule transmitted by a first device, the traffic identification rule being configured to indicate a determining condition for the access traffic of a specified type; and deliver the traffic identification rule to the rule engine.

The above specified type of access traffic may be malicious access traffic.

In an exemplary embodiment of this disclosure, it is also supported that the network content provider customizes the determining condition for the malicious access traffic, and the determining condition (namely, the above traffic identification rule) customized by the network content provider is delivered into a corresponding rule engine. Subsequently, the rule engine can determine, according to the determining condition customized by the network content provider, which access traffic is the malicious access traffic. Thus, it can be seen that, through the traffic identification rule, the rule engine can accurately identify malicious access traffic related to the current scenario, and the user can also adjust, based on transformation of application scenarios, the traffic identification rule in a targeted manner, thereby improving an adaptation range of an intrusive deployment mode.

The intrusive deployment mode is a general idea, and may be combined with various security products, such as a firewall, a web page application protection system, and a DDoS attack system. An access mode is simple, and there is no need to modify a source destination Internet protocol (IP) of a data packet, so that deployment efficiency is high.

To sum up, according to the solution shown in the exemplary embodiment of this disclosure, the cloud server establishes the probe service of intrusive traffic leading in the cloud so as to filter the access traffic for accessing the target network content, and leads only the malicious access traffic to the Honeypot service, thereby reducing the access traffic processed by the Honeypot service, saving processing resources and bandwidth resources, and improving use efficiency of system resources.

In addition, the solution shown in the exemplary embodiment of this disclosure also supports the determining condition customized by the target network provider for the malicious access traffic, thereby improving deployment flexibility and personalization of the Honeypot system.

Figure 6:
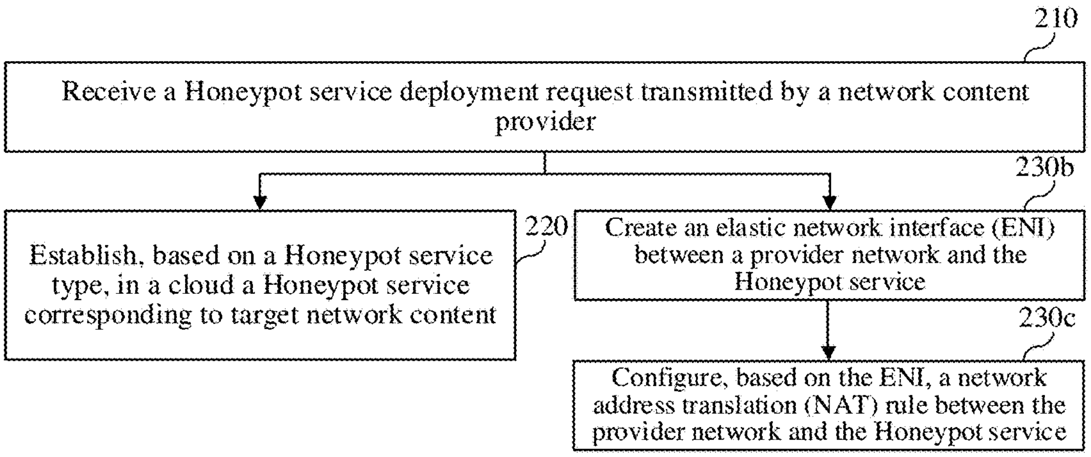
FIG. 6 is a flowchart of a method for processing a security service according to an exemplary embodiment of this disclosure.

Based on the above solution shown in FIG. 2, FIG. 6 shows a flowchart of a method for processing a security service according to an exemplary embodiment of this disclosure. In other words, in a case that the probe service type includes the non-intrusive traffic leading type, operation 230 may be replaced with operation 230*b* and operation 230*c*.

Operation 230*b*: Create an ENI between a provider network and a Honeypot service.

The provider network is a network providing target network content.

According to different traffic leading modes, the above ENI may be deployed on a provider network side, or may be deployed in a cloud.

The above traffic leading mode may include an EIP mode, an Intranet IP mode, an LB mode, and the like.

The above EIP mode refers to a traffic leading mode in which access traffic is forwarded through the EIP.

The above Intranet IP mode refers to a traffic leading mode in which the access traffic is forwarded through the Intranet IP.

The above LB mode refers to a traffic leading mode in which the access traffic is forwarded in a manner of LB.

Operation 230*c*: Configure, based on the ENI, a network address translation (NAT) rule between the provider network and the Honeypot service.

The NAT rule is configured to instruct the ENI to forward access traffic to the target network content to the Honeypot service.

In the solution shown in the exemplary embodiment of this disclosure, the cloud server may be configured with the ENI of the NAT rule between the provider network and the Honeypot service, to establish the above non-intrusive traffic leading-based probe service.

In an exemplary implementation, in a case that the traffic leading mode is the EIP mode or the Intranet IP mode, that create an ENI between a provider network and a Honeypot service includes:

create a VPC in the provider network;

insert the ENI in the VPC, where the ENI is bound to the Honeypot service; and apply for a virtual address of the ENI in the VPC, the virtual address of the ENI being bound to a public network address or an Intranet address of the provider network.

In an exemplary implementation, in the case of the above EIP mode or the above Intranet IP mode, the operations of creating the ENI between the provider network and the Honeypot service, and configuring, based on the ENI, the NAT rule between the provider network and the Honeypot service may be performed by a configuration component installed in a control terminal/configuration terminal of the provider network. The configuration component may be downloaded and installed by the control terminal/configuration terminal from the cloud server. For example, the configuration component may be a software component in the form of an application program, a plug-in, or middleware. In the case of the EIP mode or the Intranet IP mode of the cloud server, in the operations: create the ENI between the provider network and the Honeypot service and configure, based on the ENI, the NAT rule between the provider network and the Honeypot service, related first configuration information may be transmitted to the configuration component. The configuration component creates, according to the above first configuration information, in the provider network the ENI between the provider network and the Honeypot service, and configures, based on the ENI, the NAT rule between the provider network and the Honeypot service. The above first configuration information may include the NAT rule between the provider network and the Honeypot service, and the like.

In an exemplary implementation, in a case that the traffic leading mode is the LB mode, that create an ENI between a provider network and a Honeypot service includes:

creating a proxy host in the VPC of the provider network;

creating, based on the proxy host, a destination network address translation (DNAT) rule, the DNAT rule being configured to forward traffic of the proxy host to the Honeypot service; and applying for the ENI in the VPC where the Honeypot service is located; and binding the ENI to the proxy host.

The above processes of creating the proxy host in the VPC of the provider network, creating, based on the proxy host, the DNAT rule, and binding the ENI to the proxy host may be performed by the configuration component installed in the control terminal/configuration terminal of the provider network. For example, in a case that the traffic leading mode of the cloud server is the LB mode, related second configuration information may be transmitted to the configuration component. The configuration component creates, according to the above second configuration information, the proxy host in the VPC of the provider network, creates, based on the proxy host, the DNAT rule, and binds the ENI to the proxy host. The above second configuration information may include the above DNAT rule and identification information of the ENI (for example, a virtual address of the ENI), and the like.

In an exemplary implementation, the cloud server may also bind a security group rule for the ENI. The security group rule is configured to prohibit the access traffic leaded into the Honeypot service from actively accessing the provider network.

In a case that the above ENI is configured in the provider network, the above process of binding the security group rule for the ENI may also be performed by the configuration component installed in the control terminal/configuration terminal of the provider network. For example, the cloud server may transmit related third configuration information to the configuration component, and the configuration component binds, according to the above third configuration information, the security group rule for the ENI. The above third configuration information may include information such as the above security group rule.

In an exemplary embodiment of this application, for a problem that after an attacker attacks a Honeypot and further escapes, the Honeypot can be used as a springboard to expand an intrusion range, the cloud server may bind the security group rule for the ENI, so that the Honeypot service and a production environment of the tenant can only circulate unidirectionally, which avoids a situation in which malicious access traffic of the attacker moves laterally to other assets of the tenant, thereby improving security.

Figure 7:
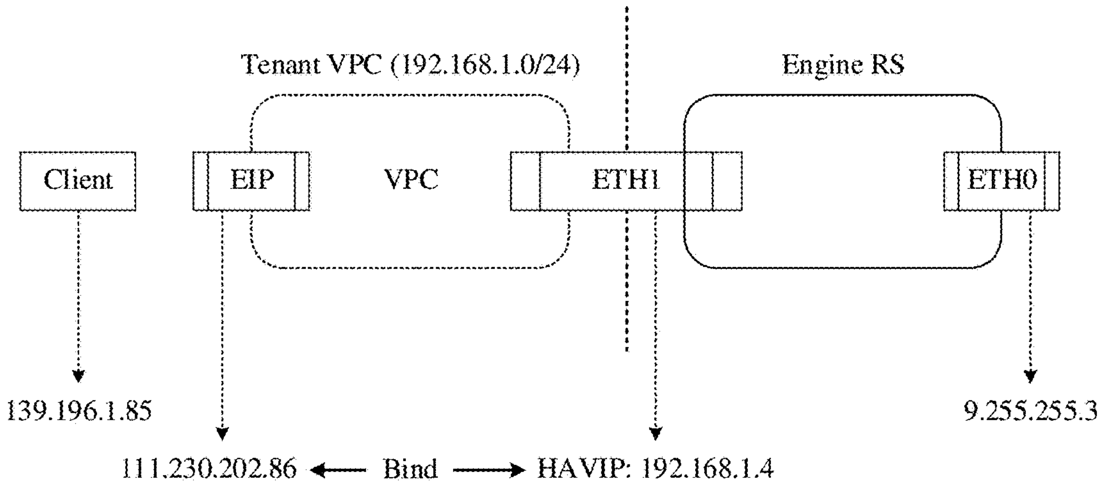
FIG. 7 is a schematic frame diagram of establishment of a probe service according to the exemplary embodiment in FIG. 6.

Please refer to FIG. 7 which shows a schematic frame diagram of establishment of a probe service according to an exemplary embodiment of this application. As shown in FIG. 7, with an EIP mode as an example, an establishment process of a non-intrusive traffic leading type-based probe service may be as follows:

S1: Create a VPC in a network of a tenant, and fix a CIDR network segment (such as 192.168.1.0/24).

S2: Insert a cross-tenant ENI (for example, eni-4rihkbgn) in the VPC of the tenant, and bind the same to an RS of a Honeypot mother machine.

S3: Apply for an HAVIP (for example, 192.168.1.4) from the VPC of the tenant, and then swipe to a network interface eni-4rihkbgn.

S4: Bind EIP and the HAVIP of the tenant, which implements direct connection between the EIP of the tenant and the network interface, namely, 111.230.202.86 and 192.168.1.4 are bound, so that a tenant network and a Honeyfarm network are connected.

In FIG. 7, the tenant network is shown on the left of a dashed line, and the Honeyfarm network is shown on the right thereof. The two networks are isolated.

S5: Different Honeypot services are virtualized on the HAVIP, for example, 192.168.1.4:2222 is set and forwarded to an SSH Honeypot.

S6: In this case, unidirectional data routing is already configured, and then a piece of backhaul routing is added, so that network communication can be implemented.

For example, a routing table: ip route add default via 192.168.1.4 dev eth1 table 100 is newly added.

A source routing policy: ip rule add from 192.168.1.4 table 100 is newly added.

S7: When a user (139.196.1.85) accesses a probe EIP (111.230.202.86) 2222 port, it is equivalent to accessing an SSH Honeypot service.

S8: Finally, a security group rule is bound for an ETH1 network interface, to prohibit traffic of a Honeyfarm from actively accessing the network of the tenant.

A principle of establishing the probe service of the non-intrusive traffic leading type in the Intranet IP mode is similar to a principle of establishing the probe service of the non-intrusive traffic leading type in the EIP mode. Details are not described herein again.

Figure 8:
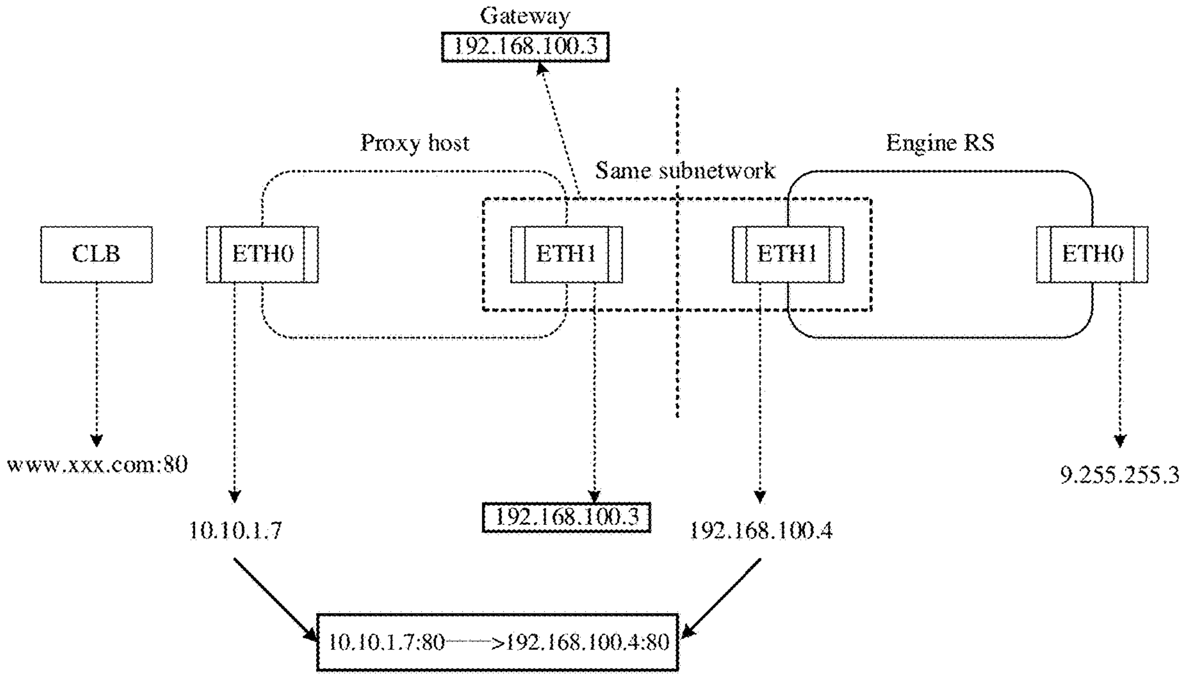
FIG. 8 is a schematic frame diagram of establishment of a probe service according to the exemplary embodiment in FIG. 6.

Traffic attracted in the LB mode may be forwarded, based on different Uniform Resource Identifiers (URI) of a current domain name of a tenant, to different Honeypots, and can be better hidden in the real service. Please refer to FIG. 8 which shows a schematic frame diagram of establishment of a probe service according to an exemplary embodiment of this application. As shown in FIG. 8, with an LB mode as an example, an establishment process of a non-intrusive traffic leading type-based probe service may be as follows:

S1: Reversely insert a network interface (namely, a network interface of a Honeyfarm is bound to a machine of a tenant), and a process is as follows:

(A) Establish a machine, referred to as a Proxy (10.10.1.7), in a VPC of a CLB of the tenant.

(B) Create a Honeypot mother machine RS (192.168.100.4) in the Honeyfarm, and create a corresponding Honeypot service.

(C) Create a DNAT rule, so that traffic of 192.168.100.4 IP is forwarded to the Honeypot service.

(D) Apply for a cross-tenant ENI EHT1 (192.168.100.3) at a VPC of a Honeypot engine RS, and bind the same to the Proxy machine of the tenant.

S2: At this moment, the network of the tenant and the Honeyfarm network logically interwork through the ETH1.

If the access traffic of port 80 that requires a domain name is forwarded to the Honeyfarm, the DNAT forwarding policy, namely: 10.10.1.7:80→192.168.100.4:801 needs to be configured on the PROXY machine of the tenant. At this moment, the traffic of port 80 of the domain name can be forwarded into the Honeypot service through the ETH1.

S3: Finally, a security group rule is bound for an ETH1 network interface, to prohibit traffic of a Honeyfarm from actively accessing the network of the tenant.

Based on the above, according to the solution shown in the exemplary embodiment of this application, the cloud server establishes the probe service of non-intrusive traffic leading, to lead the access traffic for accessing the target network content to the Honeypot service in full, which avoids having an impact on a service business of the network content provider.

In addition, the solution shown in the exemplary embodiment of this application further supports prohibiting the traffic of the Honeyfarm from actively accessing the network of the tenant, thereby improving security of a Honeypot system.

Based on the solution shown in the above exemplary embodiment of this application, the tenant does not need to care about a specific network topology, does not need to configure complex network policies, and only needs to select a deployment mode and designate a Honeypot deployment position according to requirements, and then can resolve a deployment problem in one key, which leads specified traffic into the Honeypot system. Intrusive deployment can protect a service to the maximum extent, detects known malicious attacks, and is suitable for services with high security requirements. Non-intrusive deployment provides a common service deployment mode, which makes it difficult to distinguish a real service from the Honeypot service. Meanwhile, a Honeynet and the production environment of the tenant can only circulate unidirectionally, which avoids that malicious traffic of an attacker moves laterally to other assets of the tenant.

Figure 9:
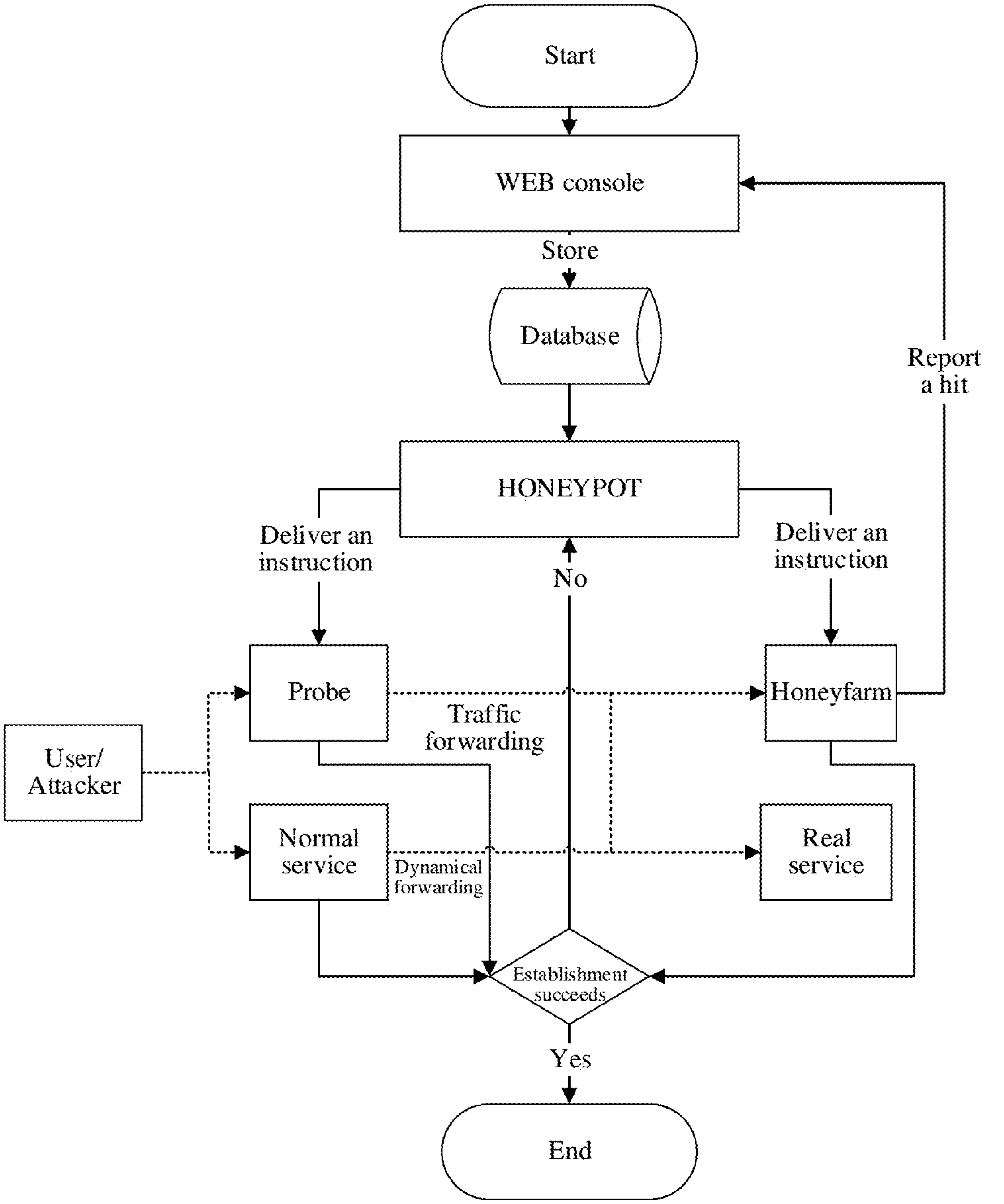
FIG. 9 is a flowchart of Honeypot creation and traffic lead provided by this disclosure.

Based on the solution shown in FIG. 2, FIG. 4, or FIG. 6, please refer to FIG. 9 which shows a flowchart of Honeypot creation and traffic lead provided by this disclosure. As shown in FIG. 9, the Honeypot creation and traffic lead process is as follows:

S1: A tenant selects to create a probe type and a Honeypot service on a WEB console. The probe type supported to be created is: intrusive dynamic traffic leading and non-intrusive full traffic leading.

S2: A cloud saves created configuration information in a database (for example, an MYSQL database), and a background service (a HONEYPOT management service) reads all rules of a current user from MYSQL, creates the probe type selected by the tenant, and performs traffic leading.

S3: Deliver a Honeypot type selected by the tenant to a Honeyfarm, and create a specified type of Honeypot service.

S4: Establish a probe service.

An intrusive dynamic traffic leading creation procedure may include:

(A) The current malicious traffic identification feature of the tenant is delivered, and traffic hitting features may be forwarded to a Honeypot.

(B) A Honeypot address forwarded by the tenant is delivered.

A non-intrusive full traffic leading creation procedure may include:

(A) After both an ENI and Honeypots of Honeyfarm species are created, corresponding DNAT and source network address translation (SNAT) rules are configured, so that traffic of a probe IP and a port can be forwarded to corresponding Honeypot services.

(B) A security group policy is configured for a cross-tenant network interface to prevent traffic of the Honeyfarm from actively accessing a network on a probe side, thereby ensuring that even if the Honeypot is attacked, the production environment of the tenant is still not affected.

S5: If creation of any one of a probe or the Honeyfarm fails, a message is reported to a HONEYPOT background service for retry processing. If retry still fails, a specific error is replied to a console for display.

S6: If services are all successfully created, in an intrusive deployment mode, when a user accesses a normal service of the user, a normal page is returned at this moment, and if the user accesses the normal service with an attack feature, the traffic is redirected to a Honeypot cluster of the user. In a non-intrusive mode, when the user accesses or scans a Honeypot probe exposed by the user, across-tenant ENI transfers traffic from a network of the tenant to the Honeyfarm species, and then maps the traffic to different Honeypot services according to corresponding IPs and ports.

S7: After the access traffic of the user enters the Honeypot service, a series of actions, such as moving horizontally and scanning, bursting, and drawing a virtual resource to collect a sample, may be performed and the Honeypot service records the actions in real time, and then reports the actions to a tenant console and presents the actions to the tenant.

This application discloses a Honeypot cluster implementation solution based on dynamic traffic lead of a cloud tenant, which includes: an intrusive dynamic traffic leading Honeypot solution and a non-intrusive full traffic leading Honeypot solution.

The intrusive dynamic traffic leading Honeypot solution refers to: the Honeypot service completely intrudes into the normal service, when a sensing system detects that a malicious attack exists in service traffic, a forwarding rule is dynamically generated, and a malicious session is forwarded to a Honeypot cluster to protect on-cloud assets. When the sensing system detects normal traffic, the current session may be released and forwarded, in the original way, to the real service of the customer. The non-intrusive full traffic leading Honeypot solution refers to: the Honeypot service is stripped away from the normal service, the Honeypot service is deployed separately, and in combination with a service model of the customer, requested traffic is leaded to a prearranged Honeypot cluster in full through multiple types of probes such as an EIP, a specified domain name URI (LB), and an Intranet IP.

According to the intrusive dynamic traffic leading, 302 may be returned to the user after an attack is detected, so that an attacker jumps to access the Honeypot. Non-intrusive full traffic leading may be forwarded to a Honeynet cluster through the cross-tenant ENI and a routing policy, and traffic of different ports is forwarded to different types of Honeypots. Malicious traffic actually interacts with the Honeypot to acquire all types of attack laws of the attacker and delay the attack speed, and strive for more time for a defender. Finally, all traffic logs and host behavior logs are captured, a corresponding loss alert is generated, and an alert log is displayed on a user firewall console, to remind the user that on-cloud Honeypots have been attacked, thereby reminding the user that the currently attacked source IP attempts to attack user assets in some means. Further, other security products: a firewall, a web page application firewall, a security operation center, a host, and the like, may be combined to take measures such as forbidding a source IP to limit that the IP further expands an attack range, thereby protecting on-cloud core assets against attack.

The cloud tenant-based dynamic traffic leading solution provided in this disclosure is different from a conventional Honeypot deployment mode. The user only needs to select a deployment mode, and then performs a one-key operation so as to complete all resource allocation and policy configuration in the background. The user does not need to focus on an underlying complex network topology and configuration policy.

Conventional Honeypots do not have a very good universal solution in terms of isolation of the Honeyfarm and the production environment of the tenant, and can only ensure security through a large number of remission measures, and consequently complexity is high. However, the Honeypots provided in this disclosure ensure, through proper network division and a mode of binding the security group to the ENI connecting the tenant and the Honeyfarm, that network access can only be one-way access from a probe to the Honeyfarm, and cannot be returned to the production environment of the tenant from the Honeyfarm, thereby ensuring network isolation security of the tenant. In the above deployment mode, intrusive deployment and non-intrusive deployment are provided, respectively satisfying requirements of different business scenarios. The intrusive deployment can meet services with high security requirements, does not allow known attack traffic to go to a business background service, and provides user-customized feature forwarding at the same time, which greatly enriches the degrees of freedom of forwarding rules. A series of maintenance actions such as upgrading of various patches in the background service are also avoided, so that operation and maintenance pressure is alleviated. The non-intrusive deployment provides rich forms of exposure, starts from common modes of exposure of the on-cloud assets, and supports modes such as the EIP and the CLB, which ensures that exposure forms of the Honeypots do not depart from the real service, improves the disguise degree of the Honeypots, and achieves a very good disguise effect. Meanwhile, an Intranet probe is supported, which can sense, for the first time, a lateral movement behavior initiated by the malicious traffic of the attacker after the user is lost, and an attack alert is pushed to the user, so that the tenant can handle an attack behavior in time, thereby reducing an asset loss.

Figure 10:
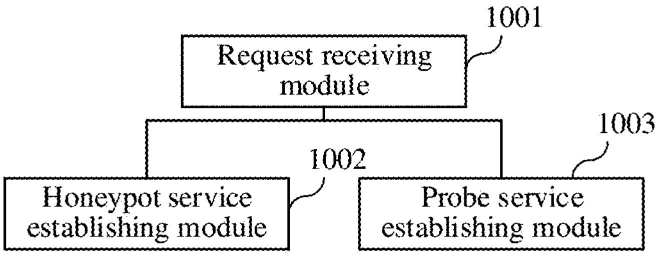
FIG. 10 is a block diagram of an apparatus processing a security service provided by an exemplary embodiment of this disclosure.

FIG. 10 shows a block diagram of an apparatus processing a security service according to an exemplary embodiment of this disclosure. The apparatus may be configured to perform all or some of the operations of the method shown in FIG. 2, FIG. 4, or FIG. 6. As shown in FIG. 10, the apparatus includes:

a request receiving module 1001, configured to receive a Honeypot service deployment request transmitted by a network content provider, the Honeypot service deployment request being configured to indicate a probe service type and a Honeypot service type, and the probe service type being configured to indicate a traffic leading mode;

a Honeypot service establishing module 1002, configured to establish, based on the Honeypot service type, in a cloud a Honeypot service corresponding to target network content, the target network content being network content provided by the network content provider; and a probe service establishing module 1003, configured to establish a probe service of the probe service type, the probe service being configured to lead access traffic to the target network content to the Honeypot service.

In an exemplary implementation, the probe service type includes an intrusive traffic leading type or a non-intrusive traffic leading type.

In an exemplary implementation, in response to that the probe service type includes the intrusive traffic leading type, the probe service establishing module 1003 is configured to:

create a rule engine and a leading engine of the probe service in the cloud, the rule engine being configured to identify whether the access traffic to the target network content is access traffic of a specified type, and the leading engine being configured to lead, based on an identification result of the rule engine, the access traffic of a specified type to the Honeypot service.

In an exemplary implementation, the apparatus further includes:

a rule receiving module, configured to receive a traffic identification rule transmitted by a first device, the traffic identification rule being configured to indicate a determining condition for the access traffic of a specified type; and a rule delivery module, configured to deliver the traffic identification rule to the rule engine.

In an exemplary implementation, in response to that the probe service type includes the non-intrusive traffic leading type, the probe service establishing module 1003 is configured to:

create an elastic network interface (ENI) between a provider network and the Honeypot service, the provider network being a network providing the target network content; and configure, based on the ENI, a network address translation (NAT) rule between the provider network and the Honeypot service, the NAT rule being configured to instruct the ENI to forward the access traffic to the target network content to the Honeypot service.

In an exemplary implementation, the probe service establishing module 1003 is configured to:

create a virtual private cloud (VPC) in the provider network;

insert the ENI in the VPC, the ENI being bound to the Honeypot service;

apply for, in the VPC, a virtual address of the ENI; and bind the virtual address of the ENI to a public network address or an Intranet address of the provider network.

In an exemplary implementation, the probe service establishing module 1003 is configured to:

create a proxy host in the VPC of the provider network, the VPC corresponding to the Honeypot service;

create, based on the proxy host, a destination network address translation (DNAT) rule, the DNAT rule being configured to forward traffic of the proxy host to the Honeypot service;

apply for the ENI in the VPC; and bind the ENI to the proxy host.

In an exemplary implementation, the probe service establishing module 1003 is further configured to bind a security group rule for the ENI, the security group rule being configured to prohibit access traffic leaded into the Honeypot service from actively accessing the provider network.

In an exemplary implementation, the apparatus further includes:

an obtaining module, configured to obtain an establishment result and a number of establishment times of the Honeypot service or the probe service; and a reestablishing module, configured to reestablish, in response to that the establishment result is that establishment fails and the number of establishment times does not reach a number of times threshold, the Honeypot service or the probe service failing to be established.

In an exemplary implementation, the apparatus further includes:

an information returning module, configured to return, in response to that the establishment result is that establishment fails and the number of establishment times reaches the number of times threshold, information indicating that the Honeypot service or the probe service fails to be established to a console of a cloud server.

In an exemplary implementation, the apparatus further includes:

a recording module, configured to record a behavior record of the access traffic in the Honeypot service; and a transmitting module, configured to return the behavior record to the network content provider.

Figure 11:
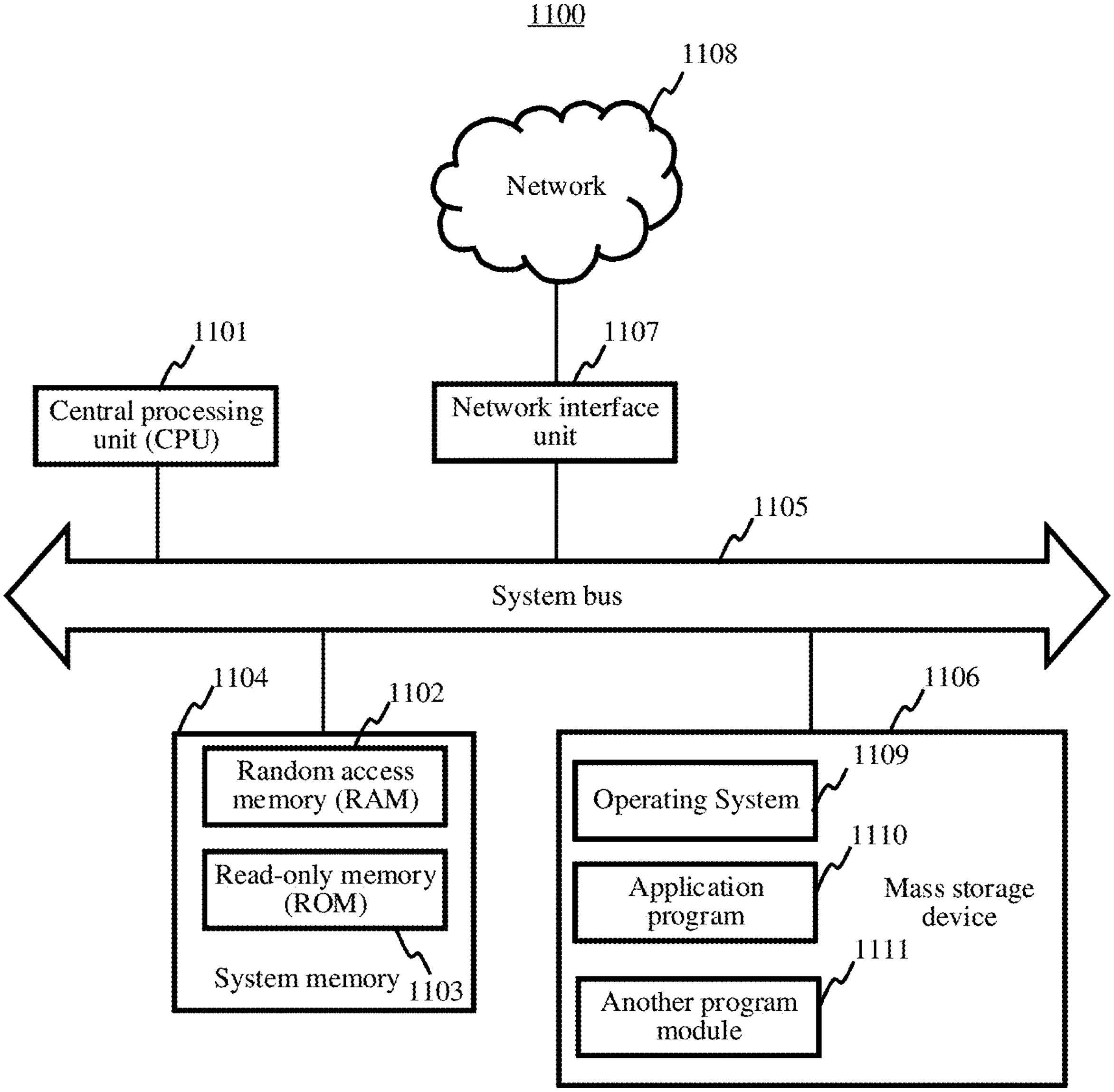
FIG. 11 is a structural block diagram of a computer device according to an exemplary embodiment of this disclosure.

FIG. 11 shows a structural block diagram of a computer device 1100 according to an exemplary embodiment of this disclosure. The computer device may be implemented as a cloud server in the above solution of this disclosure. The computer device 1100 includes a central processing unit (CPU) 1101, a system memory 1104 including a random access memory (RAM) 1102 and a read-only memory (ROM) 1103, and a system bus 1105 connecting the system memory 1104 and the CPU 1101. The computer device 1100 further includes a mass storage device 1106 configured to store an operating system 1109, an application program 1110, and another program module 1111.

The large-capacity storage device 1106 is connected to the CPU 1101 by using a large-capacity storage controller (not shown) connected to the system bus 1105. The mass storage device 1106 and a computer-readable medium associated with the large-capacity storage device provide non-volatile storage to the computer device 1100, namely, the mass storage device 1106 may include a computer-readable medium (not shown) such as a hard disk or a compact disc ROM (CD-ROM) drive.

Generally, the computer-readable medium may include a computer storage medium and a communication medium. The computer storage medium includes volatile and non-volatile media, and removable and non-removable media implemented by using any method or technology configured for storing information such as computer-readable instructions, data structures, program modules, or other data. The computer storage medium includes an RAM, an ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, persons skilled in art can know that the computer storage medium is not limited to the above several types. The system memory 1104 and the mass storage device 1106 may be collectively referred to as a memory.

According to the various exemplary embodiments of this disclosure, the computer device 1100 may further be connected, through a network such as the Internet, to a remote computer on the network to run. That is, the computer device 1100 may be connected to a network 1108 by means of a network interface unit 1107 connected to the system bus 1105, or may be connected to another type of network or a remote computer system (not shown) by using a network interface unit 1107.

The memory further includes at least one computer program. The at least one computer program is stored in a memory. By performing the at least one computer program, the CPU 1101 implements all or some of the operations of the methods shown in the above exemplary embodiments.

In an exemplary embodiment, a computer-readable storage medium is further provided, and is configured for storing at least one computer program, where the at least one computer program is loaded and performed by a processor to implement all or some of the operations of the methods shown in the above exemplary embodiments. For example, the computer-readable storage medium may be an ROM, an RAM, a CD-ROM, a magnetic tape, a floppy disk, an optical data storage device, or the like.

In an exemplary embodiment, the embodiment of this disclosure further provides a computer program product including computer programs, where the computer program product, when running on a computer, makes the computer perform the method provided by the above exemplary embodiments.

After considering the specification and practicing the present disclosure, a person skilled in the art may easily conceive of other implementations of this disclosure. This disclosure is intended to cover any variations, uses, or adaptive changes of this disclosure. These variations, uses, or adaptive changes follow the general principles of this disclosure and include common general knowledge or common technical means in the art, which are not disclosed in this disclosure. The specification and the exemplary embodiments are considered as merely exemplary, and the real scope and spirit of this disclosure are pointed out in the following claims.

This disclosure is not limited to the precise structures described above and shown in the accompanying drawings, and various modifications and changes can be made without departing from the scope of this disclosure.

What is claimed is:

1. A method for processing a security service, the method being performed by a cloud server and comprising:

pushing, by the cloud server, a Honeypot configuration page to a first device of a network content provider, the Honeypot configuration page being configured to allow an operator of the network content provider to configure a probe service type and a Honeypot service type;

receiving a Honeypot service deployment request transmitted by the network content provider, the Honeypot service deployment request being configured to indicate the probe service type and the Honeypot service type, and the probe service type being configured to indicate a traffic leading mode;

establishing, based on the Honeypot service type, a Honeypot service in a cloud corresponding to target network content, the target network content being network content provided by the network content provider, wherein the Honeypot service is established in a Honeypot service cluster maintained by the cloud server, the Honeypot service cluster comprising Honeypot services established for a plurality of network content providers; and establishing a probe service of the probe service type, the probe service being configured to lead access traffic to the target network content to the Honeypot service.

2. The method according to claim 1, wherein the probe service type comprises an intrusive traffic leading type or a non-intrusive traffic leading type.

3. The method according to claim 2, wherein, in response to the probe service type being an intrusive traffic leading type, the establishing a probe service of the probe service type comprises:

creating a rule engine and a leading engine of the probe service in the cloud, wherein the rule engine is configured to identify whether the access traffic to the target network content is an access traffic of a specified type; and the leading engine is configured to lead, based on an identification result of the rule engine, the access traffic of a specified type to the Honeypot service.

4. The method according to claim 3, wherein the method further comprises:

receiving a traffic identification rule transmitted by a first device, the traffic identification rule being configured to indicate a determining condition for the access traffic of the specified type; and delivering the traffic identification rule to the rule engine.

5. The method according to claim 2, wherein, in response to the probe service type being the non-intrusive traffic leading type, the establishing a probe service of the probe service type comprises:

creating an elastic network interface (ENI) between a provider network and the Honeypot service, the provider network being a network providing the target network content; and configuring, based on the ENI, a network address translation (NAT) rule between the provider network and the Honeypot service, the NAT rule being configured to instruct the ENI to forward the access traffic to the target network content to the Honeypot service.

6. The method according to claim 5, wherein the creating an ENI between a provider network and the Honeypot service comprises:

creating a virtual private cloud (VPC) in the provider network;

inserting the ENI in the VPC, the ENI being bound to the Honeypot service;

applying for, in the VPC, a virtual address of the ENI; and binding the virtual address of the ENI to a public network address or an Intranet address of the provider network.

7. The method according to claim 5, wherein the creating an ENI between a provider network and the Honeypot service comprises:

creating a proxy host in a virtual private cloud (VPC) of the provider network, the VPC corresponding to the Honeypot service;

creating, based on the proxy host, a destination network address translation (DNAT) rule, the DNAT rule being configured to forward traffic of the proxy host to the Honeypot service;

applying for the ENI in the VPC; and binding the ENI to the proxy host.

8. The method according to claim 5, wherein the method further comprises:

binding a security group rule for the ENI, the security group rule being configured to prohibit the access traffic in the Honeypot service from actively accessing the provider network.

9. The method according to claim 1, wherein the method further comprises:

obtaining an establishment result and a number of establishment times of the Honeypot service or the probe service; and reestablishing, in response to that the establishment result is that establishment fails and the number of establishment times does not reach a number of times threshold, the Honeypot service or the probe service failed to be established.

10. The method according to claim 9, wherein the method further comprises:

returning, in response to that the establishment result is that establishment fails and the number of establishment times reaches the number of times threshold, information indicating that the Honeypot service or the probe service fails to be established to a console of the cloud server.

11. The method according to claim 1, wherein the method further comprises:

recording a behavior record of the access traffic in the Honeypot service; and returning the behavior record to the network content provider.

12. A computer device comprising a processor and a memory, the memory having at least one computer program stored therein, and the at least one computer program being loaded and performed by the processor to:

push, by a cloud server, a Honeypot configuration page to a first device of a network content provider, the Honeypot configuration page being configured to allow an operator of the network content provider to configure a probe service type and a Honeypot service type;

receive a Honeypot service deployment request transmitted by the network content provider, the Honeypot service deployment request being configured to indicate the probe service type and the Honeypot service type, and the probe service type being configured to indicate a traffic leading mode;

establish, based on the Honeypot service type, a Honeypot service in the cloud corresponding to target network content, the target network content being network content provided by the network content provider, wherein the Honeypot service is established in a Honeypot service cluster maintained by the cloud server, the Honeypot service cluster comprising Honeypot services established for a plurality of network content providers; and establish a probe service of the probe service type, the probe service being configured to lead access traffic to the target network content to the Honeypot service.

13. The computer device according to claim 12, wherein the probe service type comprises an intrusive traffic leading type or a non-intrusive traffic leading type.

14. The computer device according to claim 13, wherein, in response to the probe service type being an intrusive traffic leading type, the processor, when being configured to establish the probe service of the probe service type, is configured to:

create a rule engine and a leading engine of the probe service in the cloud, wherein the rule engine is configured to identify whether the access traffic to the target network content is an access traffic of a specified type; and the leading engine is configured to lead, based on an identification result of the rule engine, the access traffic of a specified type to the Honeypot service.

15. The computer device according to claim 13, wherein, in response to the probe service type being the non-intrusive traffic leading type, the processor, when being configured to establish the probe service of the probe service type, is configured to:

create an elastic network interface (ENI) between a provider network and the Honeypot service, the provider network being a network providing the target network content; and configure, based on the ENI, a network address translation (NAT) rule between the provider network and the Honeypot service, the NAT rule being configured to instruct the ENI to forward the access traffic to the target network content to the Honeypot service.

16. The computer device according to claim 15, wherein the processor, when being configured to create the ENI between the provider network and the Honeypot service, is configured to:

create a virtual private cloud (VPC) in the provider network;

insert the ENI in the VPC, the ENI being bound to the Honeypot service;

apply for, in the VPC, a virtual address of the ENI; and binding the virtual address of the ENI to a public network address or an Intranet address of the provider network.

17. The computer device according to claim 15, wherein the processor, when being configured to create the ENI between the provider network and the Honeypot service, is configured to:

create a proxy host in a virtual private cloud (VPC) of the provider network, the VPC corresponding to the Honeypot service;

create, based on the proxy host, a destination network address translation (DNAT) rule, the DNAT rule being configured to forward traffic of the proxy host to the Honeypot service;

applying for the ENI in the VPC; and binding the ENI to the proxy host.

18. The computer device according to claim 15, wherein the at least one computer program being loaded and performed by the processor to further to:

bind a security group rule for the ENI, the security group rule being configured to prohibit the access traffic in the Honeypot service from actively accessing the provider network.

19. The computer device according to claim 12, wherein the at least one computer program being loaded and performed by the processor to further to:

obtain an establishment result and a number of establishment times of the Honeypot service or the probe service; and reestablish, in response to that the establishment result is that establishment fails and the number of establishment times does not reach a number of times threshold, the Honeypot service or the probe service failed to be established.

20. A non-transitory computer-readable storage medium having at least one computer program stored therein, the at least one computer program being loaded and performed by a processor to:

push, by a cloud server, a Honeypot configuration page to a first device of a network content provider, the Honeypot configuration page being configured to allow an operator of the network content provider to configure a probe service type and a Honeypot service type;

receive a Honeypot service deployment request transmitted by the network content provider, the Honeypot service deployment request being configured to indicate the probe service type and the Honeypot service type, and the probe service type being configured to indicate a traffic leading mode;

establish, based on the Honeypot service type, a Honeypot service in the cloud corresponding to target network content, the target network content being network content provided by the network content provider, wherein the Honeypot service is established in a Honeypot service cluster maintained by the cloud server, the Honeypot service cluster comprising Honeypot services established for a plurality of network content providers; and establish a probe service of the probe service type, the probe service being configured to lead access traffic to the target network content to the Honeypot service.

* * * * *